United States Patent
Furuta

(10) Patent No.: US 8,974,088 B2
(45) Date of Patent: Mar. 10, 2015

(54) LIGHT-EMITTING APPARATUS CAPABLE OF MOVING BETWEEN RETRACTED POSITION AND LIGHT-EMITTING POSITION, IMAGE PICKUP APPARATUS HAVING THE LIGHT-EMITTING APPARATUS

(71) Applicant: Canon Kabushiki Kaisha, Tokyo (JP)

(72) Inventor: Takashi Furuta, Yokohama (JP)

(73) Assignee: Canon Kabushiki Kaisha (JP)

( * ) Notice: Subject to any disclaimer, the term of this patent is extended or adjusted under 35 U.S.C. 154(b) by 53 days.

(21) Appl. No.: 13/945,614

(22) Filed: Jul. 18, 2013

(65) Prior Publication Data
US 2014/0022757 A1    Jan. 23, 2014

(30) Foreign Application Priority Data
Jul. 18, 2012 (JP) ................. 2012-159604

(51) Int. Cl.
| | |
|---|---|
| G03B 19/02 | (2006.01) |
| F21V 1/00 | (2006.01) |
| G03B 15/03 | (2006.01) |
| G03B 15/05 | (2006.01) |

(52) U.S. Cl.
CPC ......... *F21L 15/02* (2013.01); *G03B 19/02* (2013.01); *G03B 15/03* (2013.01); *G03B 15/05* (2013.01); *G03B 2215/0507* (2013.01)
USPC ...................................................... 362/288

(58) Field of Classification Search
CPC ........ G03B 15/02; G03B 19/02; G03B 15/03; G03B 15/0442; G03B 15/0484; G02B 15/035; F21L 15/02; B60L 5/36; B60L 5/40; B66C 13/12; F21V 14/02; F21V 14/025; F21V 21/14; F21V 21/145; F21V 21/34
See application file for complete search history.

(56) References Cited

U.S. PATENT DOCUMENTS

| | | | | |
|---|---|---|---|---|
| 4,153,355 | A | * | 5/1979 | Ikawa et al. ................. 396/177 |
| 4,174,898 | A | * | 11/1979 | Iijima ............................. 396/65 |
| 2011/0188848 | A1 | * | 8/2011 | Sotsu ............................ 396/542 |
| 2013/0028585 | A1 | * | 1/2013 | Lee .............................. 396/165 |

FOREIGN PATENT DOCUMENTS

JP   2011-048249 A    3/2011

* cited by examiner

*Primary Examiner* — Bao Q Truong
(74) *Attorney, Agent, or Firm* — Rossi, Kimms & McDowell LLP

(57) ABSTRACT

A light-emitting apparatus which is capable of, even when an environmental temperature changes, stably reducing collision noise, vibration noise, and so on generated when the light-emitting apparatus moves from a retracted position to a light-emitting position. A movable portion has a first stopper portion coming into abutment with a first elastic member when the movable portion moves from the retracted position to the light-emitting position, and a second stopper portion coming into abutment with a second elastic member with a higher elastic coefficient than the first elastic member when the movable portion moves from the retracted position to the light-emitting position. When the movable portion moves from the retracted position to the light-emitting position, the first stopper portion comes into abutment with the first elastic member, deforming the first elastic member by a predetermined amount, and then the second stopper portion comes into abutment with the second elastic member.

9 Claims, 8 Drawing Sheets

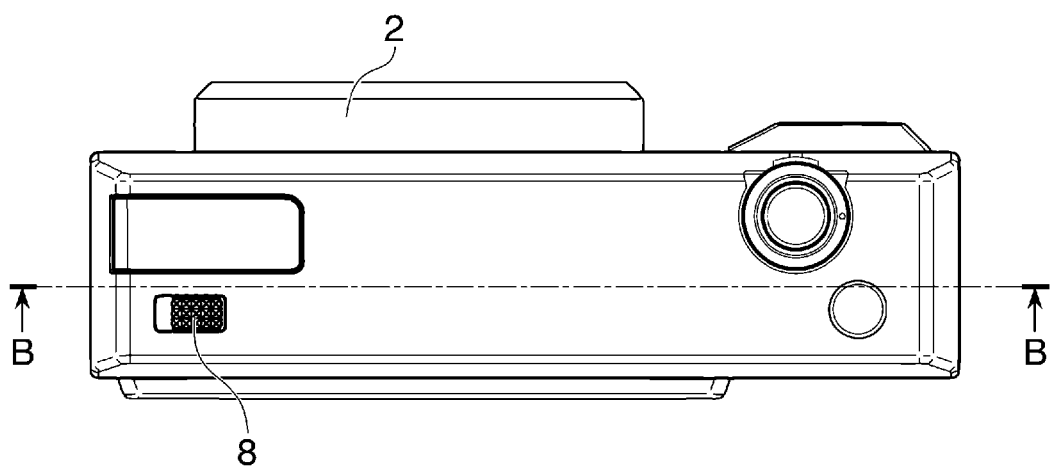
FIG. 3A
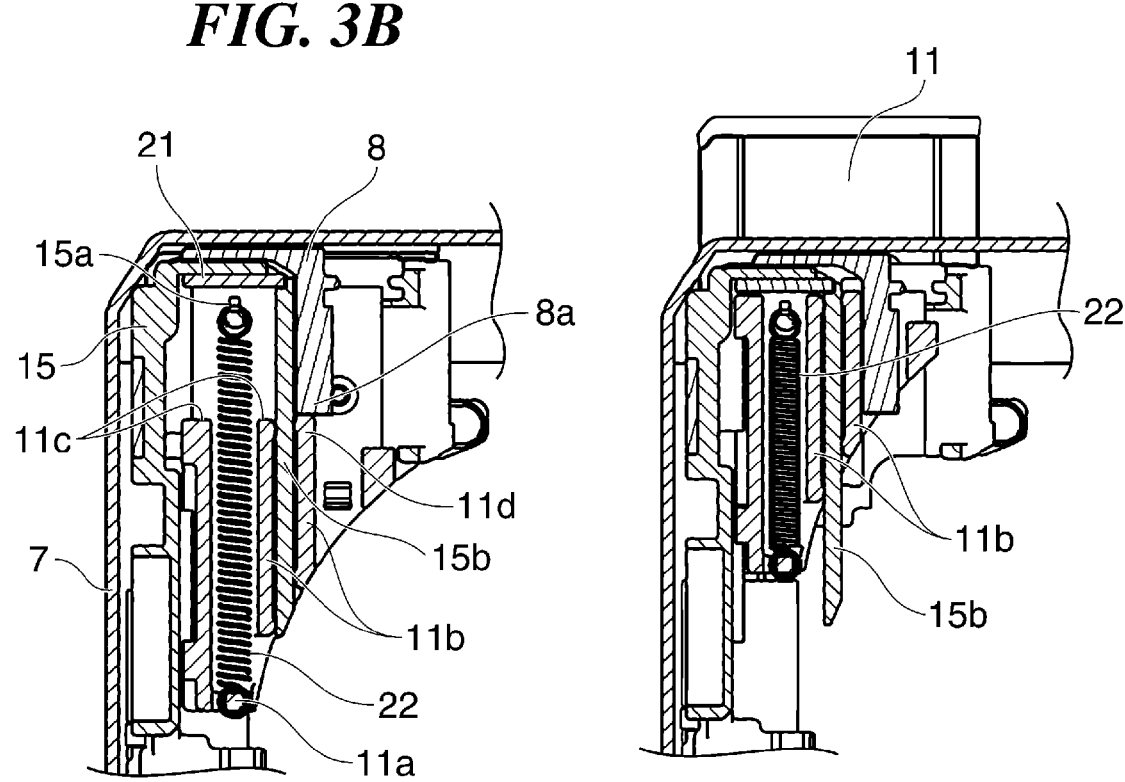
FIG. 3B
FIG. 3C

LIGHT-EMITTING APPARATUS CAPABLE OF MOVING BETWEEN RETRACTED POSITION AND LIGHT-EMITTING POSITION, IMAGE PICKUP APPARATUS HAVING THE LIGHT-EMITTING APPARATUS

BACKGROUND OF THE INVENTION

1. Field of the Invention

The present invention relates to an image pickup apparatus having a light-emitting apparatus capable of moving between a retracted position and a light-emitting position, and in particular to a technique of reducing impact when the light-emitting apparatus stops at the light-emitting position in a case where the light-emitting apparatus is moved from the retracted position to the light-emitting position using a tension of an elastic member.

2. Description of the Related Art

There is known an image pickup apparatus having a light-emitting apparatus (hereafter referred to as "the electronic flash") capable of moving between a retracted position and a light-emitting position. As an example of a method to move the electronic flash, there is known a motor drive system that moves the electronic flash by a gear connected to a motor as a drive source. As another example of a method to move the electronic flash, there is known a spring drive system that moves the electronic flash using a tension of a spring member or the like urged toward the light-emitting position. In either of these drive methods, the electronic flash is commonly moved in one of two moving modes: a rectilinear mode in which it moves in a straight line in a direction perpendicular to an optical axis and a rotary mode in which it rotatively moves about a predetermined axis.

In any of the arrangements described above, when the moving electronic flash is stopped by colliding it with a stopper portion provided in a camera body, a collision noise is generated and also, a vibration noise and a reverberation noise are generated in the whole of a camera, and these noises give a user a feeling of discomfort.

Accordingly, for example, there has been adopted a construction in which a stopper portion of a camera body which receives the moving electronic flash is provided with an elastic member such as sponge so as to reduce collision noise. Also, there has been proposed a construction in which a stopper portion for receiving and stopping a guide pin that moves with the electronic flash is comprised of an elastic member, and this stopper portion is held outside a projection range of a direction in which the guide pin moves, so that impact can resist being transmitted to the whole of a camera (see Japanese Laid-Open Patent Publication (Kokai) No. 2011-48249).

However, the above prior arts have problems that when the electronic flash is moved in the rotary mode, deformation of the stopper portion occurring as the number of use increases degrades the positional accuracy of a housing for the electronic flash. When the positional accuracy of the housing for the electronic flash decreases, the angle of a direction in which light is emitted to a subject deviates, which may cause the contrast of a taken image to be uneven. On the other hand, the stiffness of the elastic member is increased to some extent so as to improve the positional accuracy of the housing for the electronic flash, and it is thus thought that obtaining high silencing performance is difficult.

Here, irrespective of whether the electronic flash is of the rectilinear type or the rotary type, it is thought that when an elastic member such as sponge is used for the stopper portion, higher silencing performance can be obtained as compared to elastomer and silicon rubber. However, such a material becomes permanently distorted to a large degree particularly when left in a high-temperature environment, and a high degree of positional accuracy is difficult to obtain. This problem will be more apparent if the thickness of such a material is increased so as to obtain higher silencing performance.

SUMMARY OF THE INVENTION

The present invention provides a light-emitting apparatus mounted in an image pickup apparatus, which is capable of stably reducing collision noise, vibration noise, and so on generated when the light-emitting apparatus is moved from a retracted position to a light-emitting position even when an environmental temperature changes.

Accordingly, a first aspect of the present invention provides a light-emitting apparatus having a movable portion including a light-emitting unit and capable of moving between a retracted position and a light-emitting position, comprising a first elastic member, and a second elastic member configured to have a higher elastic coefficient than the first elastic member, wherein the movable portion comprises a first stopper portion coming into abutment with the first elastic member when the movable portion moves from the retracted position to the light-emitting position, and a second stopper portion coming into abutment with the second elastic member when the movable portion moves from the retracted position to the light-emitting position, and when the movable portion moves from the retracted position to the light-emitting position, the first stopper portion comes into abutment with the first elastic member, causing the first elastic member to become deformed by a predetermined amount, and then the second stopper portion comes into abutment with the second elastic member.

Accordingly, a second aspect of the present invention provides an image pickup apparatus comprising a light-emitting apparatus configured to have a movable portion including a light-emitting unit and capable of moving between a retracted position and a light-emitting position, a first elastic member and a second elastic member having a higher elastic coefficient than the first elastic member, in which the movable portion comprises a first stopper portion coming into abutment with the first elastic member when the movable portion moves from the retracted position to the light-emitting position, and a second stopper portion coming into abutment with the second elastic member when the movable portion moves from the retracted position to the light-emitting position, and when the movable portion moves from the retracted position to the light-emitting position, the first stopper portion comes into abutment with the first elastic member, causing the first elastic member to become deformed by a predetermined amount, and then the second stopper portion comes into abutment with the second elastic member.

According to the present invention, the light-emitting apparatus is unsusceptible to a change in environmental temperature, and collision noise, vibration noise, and so on generated when a movable portion of the light-emitting apparatus is moved from the retracted position to the light-emitting position can be stably reduced even when an environmental temperature changes. Furthermore, space-saving of the image pickup apparatus can be realized.

Further features of the present invention will become apparent from the following description of exemplary embodiments (with reference to the attached drawings).

BRIEF DESCRIPTION OF THE DRAWINGS

FIG. 3A is a top view showing the digital camera appearing in FIGS. 1A and 1B, and FIGS. 3B and 3C are cross-sectional views on arrow B-B appearing in the top view.

DESCRIPTION OF THE EMBODIMENTS

The present invention will now be described in detail with reference to the drawings showing embodiments thereof. Here, a so-called compact-type digital camera is taken as an example of an image pickup apparatus according to the present invention, but the present invention is not limited to this.

A description will now be given of a digital camera according to a first embodiment which has a light-emitting apparatus of a type that is rectilinearly moved between a retracted position and a light-emitting position. Here, the digital camera is constructed such that the light-emitting apparatus formed as one unit is mounted in a camera body, and the light-emitting apparatus formed as one unit will hereafter be referred to as "the electronic flash unit".

Figure 1A:
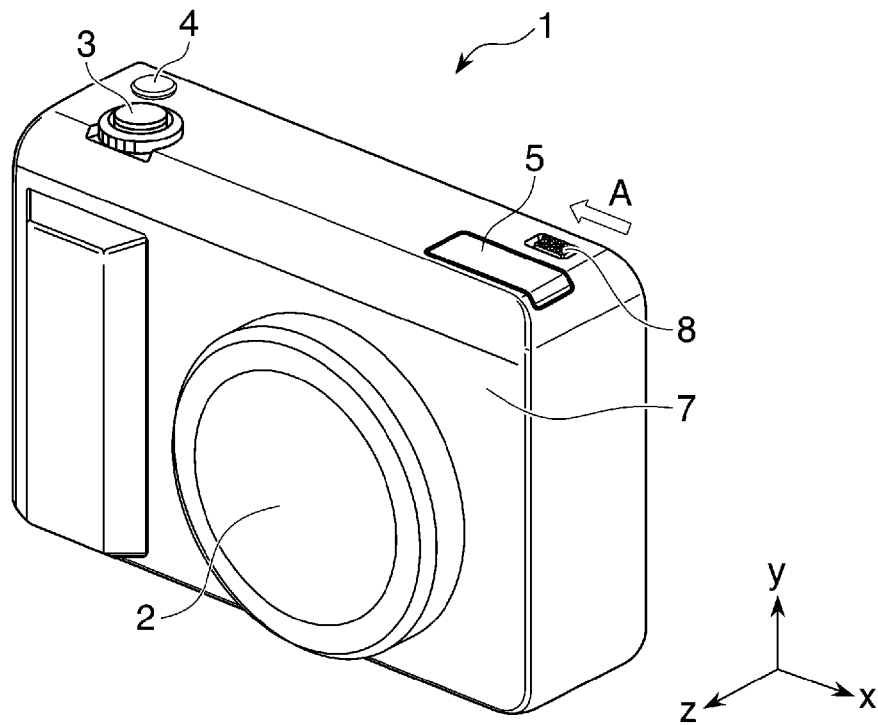
FIGS. 1A and 1B are perspective views showing an appearance of a digital camera according to a first embodiment of the present invention.
Figure 1B:
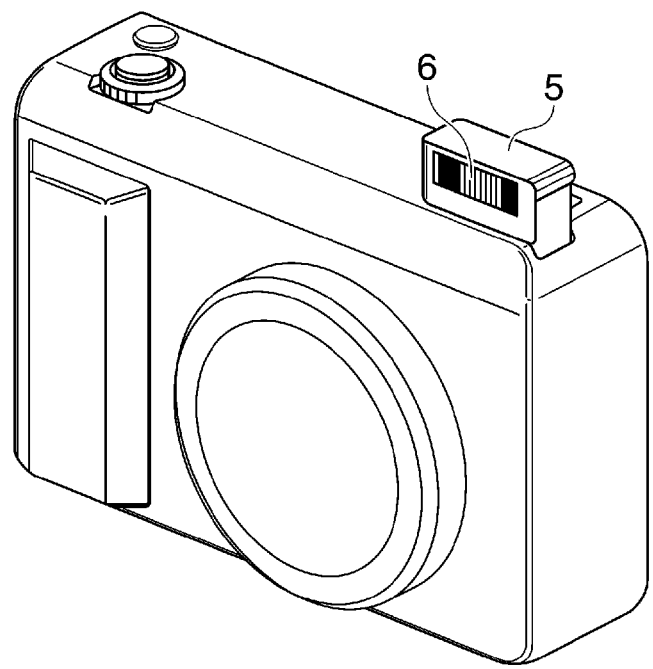

FIGS. 1A and 1B are perspective views showing an appearance of the digital camera 1 according to the first embodiment. FIG. 1A shows a state in which a movable portion (a portion that is movable with respect to a camera body in a state where the electronic flash unit is retracted in the camera body and will hereafter referred to as "the electronic flash movable portion") 5 of the electronic flash unit is retracted in the camera body. FIG. 1B shows a state in which the electronic flash movable portion 5 has popped out (projected) from the camera body and completed movement to the light-emitting position. It should be noted that as shown in FIG. 1A, for the digital camera 1 having a substantially rectangular shape, a triaxial orthogonal coordinate system is set where a width direction (horizontal direction) is an x-direction, a height direction (vertical direction) is a y-direction, and a thickness direction (front-back direction) is a z-direction, and this will be used as the need arises in the following description.

The camera body is covered with an outer cover 7, and a lens unit 2 is disposed roughly in a central part of a front surface of the camera body. A shutter button 3, a power button 4, and the electronic flash movable portion 5 are disposed on an upper surface of the camera body. The electronic flash movable portion 5 has a Fresnel lens 6 constituting a light-emitting unit.

A lock lever 8 for causing the electronic flash movable portion 5 to pop up from the camera body is provided on an upper surface of the camera body. Sliding the lock lever 8 in a direction indicated by an arrow A in FIG. 1A releases a tension (restoring force) of a tension spring 22, not shown (see FIGS. 3B and 3C), to be described later, to move the electronic flash movable portion 5 in the y-direction, causing the Fresnel lens 6 to become exposed from the camera body (the outer cover 7). It should noted that when the electronic flash movable portion 5 lies in the light-emitting position, a user or the like can move the electronic flash movable portion 5 back to the retracted position by pressing an upper surface of the electronic flash movable portion 5 against the camera body.

Figure 2A:
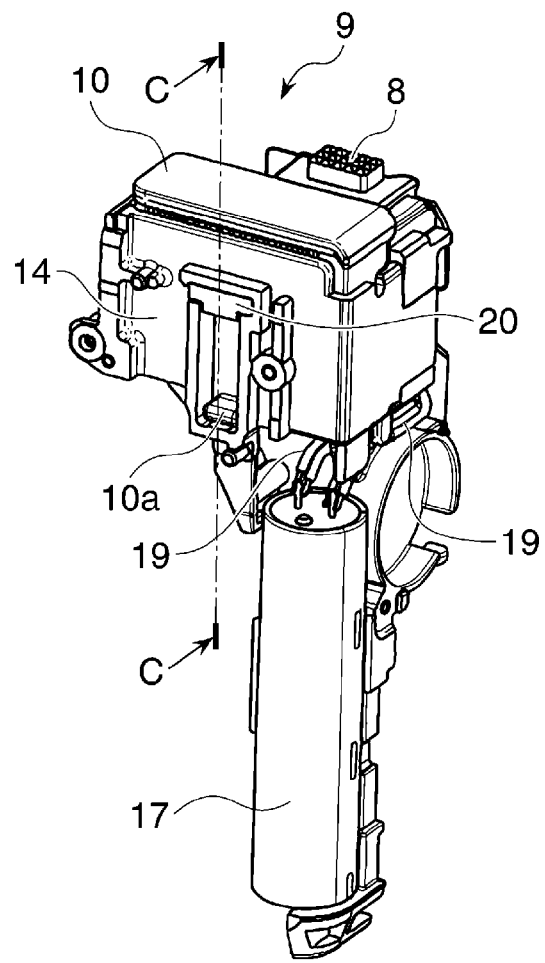
FIGS. 2A to 2C are perspective views showing an appearance of an electronic flash unit including an electronic flash movable portion appearing in FIGS. 1A and 1B.
Figure 2B:
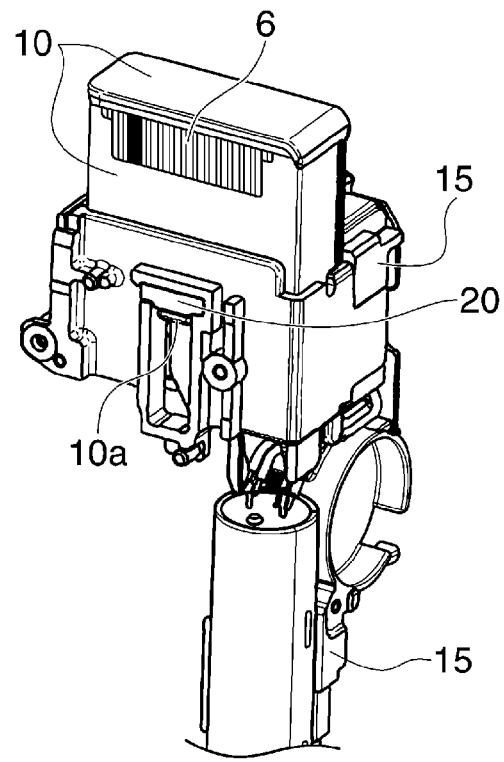
Figure 2C:
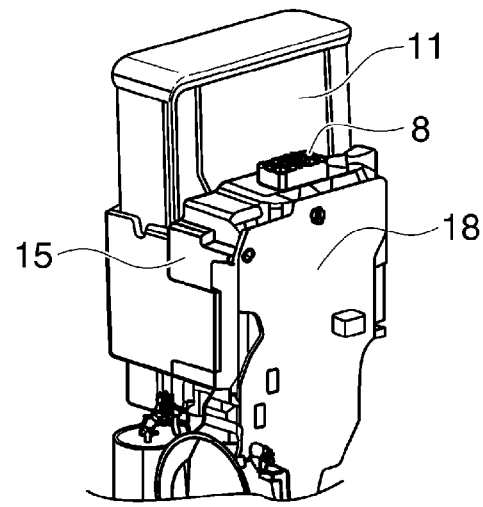

FIGS. 2A to 2C are perspective views showing an appearance of the electronic flash unit 9 including the electronic flash movable portion 5. FIG. 2A is a front perspective view showing the electronic flash movable portion 5 lying in the retracted position. FIG. 2B is a front perspective view showing the electronic flash movable portion 5 lying in the light-emitting position. FIG. 2C is a partial rear perspective view showing the electronic flash movable portion 5 lying in the light-emitting position.

In the electronic flash unit 9, the electronic flash movable portion 5 is constructed such that internal components such as the Fresnel lens 6, a xenon tube 25 (see FIGS. 4A to 4C), and a trigger coil, not shown, are placed inside a case comprised of an electronic flash front side case 10 and an electronic flash rear side case 11. The electronic flash unit 9 has a capacitor 17, a circuit substrate 18, and a wiring material 19. The xenon tube 25 and the trigger coil are connected to the capacitor 17 and the circuit substrate 18 via the wiring material 19, and they form an electric circuit for light emission. The electronic flash movable portion 5 is movably disposed inside a cover comprised of a front side cover 14 and a rear side cover 15, and the capacitor 17 and the circuit substrate 18 are mounted on the rear side cover 15.

In the electronic flash unit 9, a first stopper portion 10a is provided in a part of the electronic flash front side case 10, and a first elastic member 20 made of a cushioning material is mounted on the front side cover 14. When the electronic flash movable portion 5 moves from the retracted position to the light-emitting position, the first stopper portion 10a comes into abutment with the first elastic member 20. In the electronic flash unit 9, a second stopper portion 11c is provided in a part of the electronic flash rear side case 11 as will be described later with reference to FIGS. 3B and 3C and other figures. Accordingly, a second elastic member 21 made of a cushioning material is mounted on the rear side cover 15 as will be described later with reference to FIGS. 4A to 4C and other figures.

FIG. 3A is a top view showing the digital camera 1. FIG. 3B is a cross-sectional view on arrow B-B of FIG. 3A and shows a state in which the electronic flash movable portion 5 lies in the retracted position. FIG. 3C is a cross-sectional view on arrow B-B of FIG. 3A and shows a state in which the electronic flash movable portion 5 lies in the light-emitting position.

Ends of the tension spring 22 are hooked on a hook portion 15a formed in the rear side cover 15 and a hook portion 11a formed in the electronic flash rear side case 11, respectively. In the present embodiment, a coil spring is used as the tension spring 22, and in the retracted position shown in FIG. 3B, the tension spring is tensioned to the greatest degree.

The hook portion 15a is a fixed end, and the hook portion 11a is a movable end. Thus, in the state shown in FIG. 3B, a force that moves the electronic flash movable portion 5 from the retracted position to the light-emitting position acts on the electronic flash movable portion 5. In the state shown in FIG. 3B, however, a lock portion 8a formed in the lock lever 8 presses down an abutment portion 11d formed in the electronic flash rear side case 11, thus holding the electronic flash movable portion 5 in the retracted state. Namely, in the state shown in FIG. 3B, the lock lever 8 lies in the state shown in FIG. 1A. When in the state shown in FIG. 1A, the lock lever 8 is moved in the direction indicated by the arrow A to a position shown in FIG. 3A, the lock portion 8a is released from the abutment portion 11d, the electronic flash movable portion 5 rises due to a tension of the tension spring 22 and moves to the light-emitting position to come into the state shown in FIG. 3C.

When the electronic flash movable portion 5 is to move from the retracted position to the light-emitting position, the first stopper portion 10a comes into abutment with the first elastic member 20, and then the second stopper portion 11c formed in the electronic flash rear side case 11 comes into abutment with the second elastic member 21 mounted on the rear side cover 15. As a result, the electronic flash movable portion 5 stops in the light-emitting position. The operation of the electronic flash movable portion 5 when it stops in the light-emitting position will be described later in detail with reference to FIGS. 4A to 5B.

A main guide rib 15b is formed in the rear side cover 15. Also, two guide ribs 11b, which are formed so as to sandwich the main guide rib 15b, are formed in the electronic flash rear side case 11. Portions of the guide ribs 11b which are in sliding contact with the main guide rib 15b have a semicylindrical (approximately semicircular column-shaped) convex shape which decreases a contact area to reduce sliding friction. Also, clearances in areas of the guide ribs 11b which are in contact with the main guide rib 15b are minimized to thus reduce backlash of the electronic flash movable portion 5 in the x-direction and realize smooth movement. It should be noted that in the present embodiment, parts (upper ends) of the guide ribs 11b are configured as the second stopper portion 11c and the abutment portion 11d, respectively, so as to avoid an increase in the number of components.

Figure 4A:
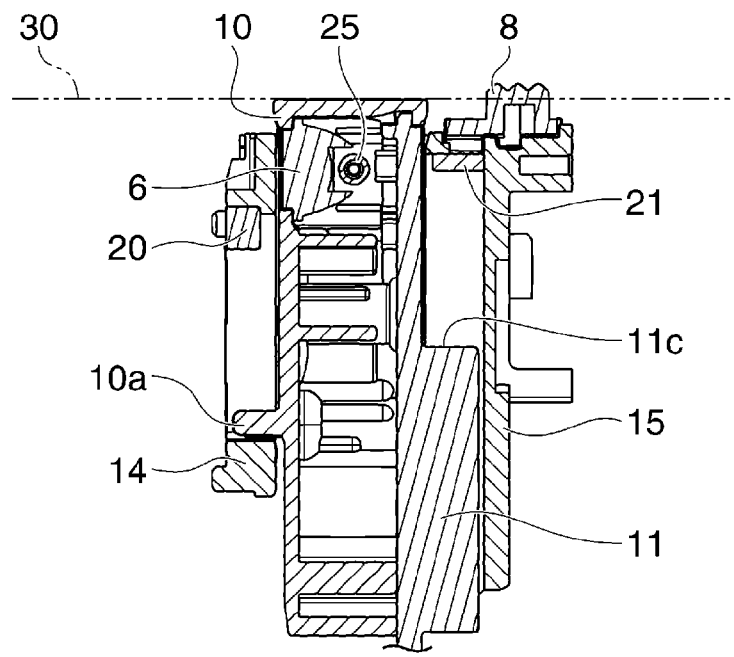
FIGS. 4A to 4C are first views of a cross-sectional view on arrow C-C showing the electronic flash unit appearing in FIG. 2A.
Figure 4B:
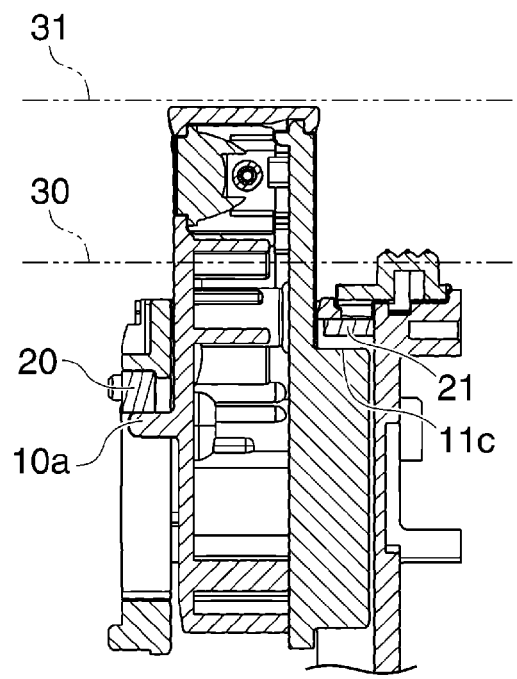
Figure 4C:
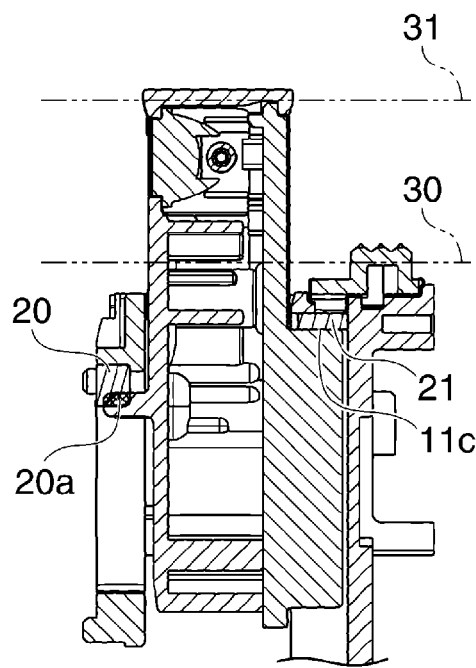
Figure 5A:
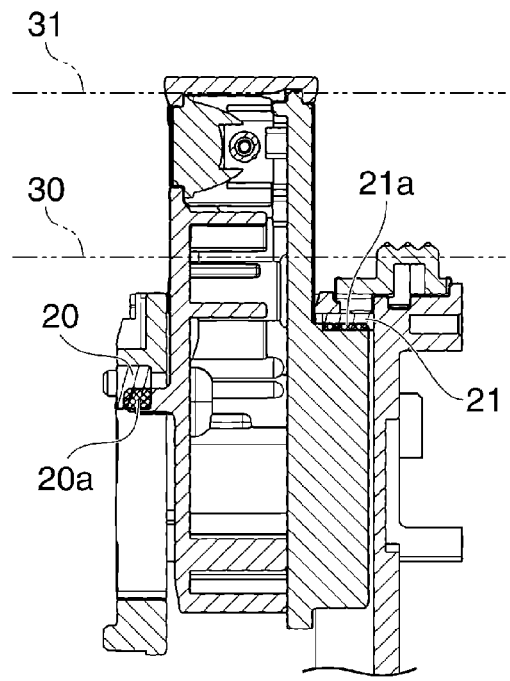
FIGS. 5A and 5B are second views on a cross-sectional view on arrow C-C showing the electronic flash unit appearing in FIG. 2A.
Figure 5B:
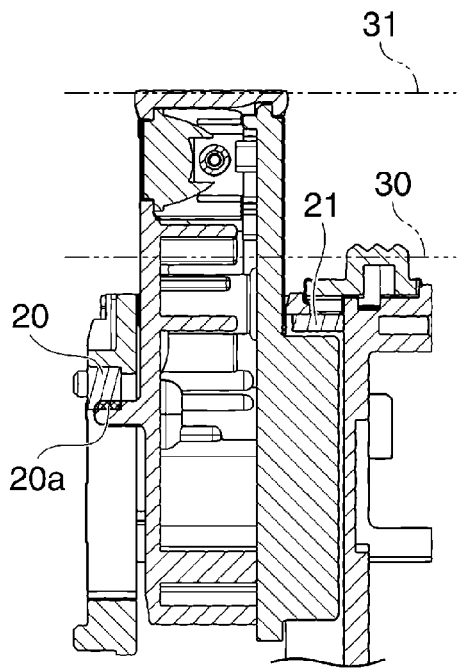

FIGS. 4A to 5B are cross-sectional views on arrow C-C showing the electronic flash unit 9 appearing in FIG. 2A, and a process in which the electronic flash movable portion 5 moves from the retracted position to the light-emitting position is shown in the following order, FIG. 4A→FIG. 4B→FIG. 4C→FIG. 5→FIG. 5B.

FIG. 4A shows a state in which the electronic flash movable portion 5 lies in the retracted position. FIG. 4B shows a state at the instant when the first stopper portion 10a comes into abutment with the first elastic member 20 when the electronic flash movable portion 5 is moving from the retracted position to the light-emitting position. FIG. 4C shows a state at the instant when the second stopper portion 11c comes into abutment with the second elastic member 21 when the electronic flash movable portion 5 is moving from the retracted position to the light-emitting position. FIG. 5A shows a state in which the electronic flash movable portion 5 lies in its uppermost position (in the y-direction). FIG. 5B shows a state in which the electronic flash movable portion 5 stops in the light-emitting position. In FIGS. 4A to 5B, the left side corresponds to a front side (subject side) of the camera body.

In FIGS. 4A to 5B, a line 30 indicates an upper surface position of the electronic flash front side case 10 in the retracted position, and a line 31 indicates an upper surface position of the electronic flash front side case 10 in the light-emitting position. The xenon tube 25 emits light in a state in which the electronic flash movable portion 5 stops in the light-emitting position, and a subject is irradiated with light through the Fresnel lens 6.

As described earlier, when the lock lever 8 is slid in the direction indicated by the arrow A in FIG. 1A in a case where the electronic flash movable portion 5 lies in the retracted position, the lock portion 8a of the lock lever 8 withdraws from the abutment portion 11d, which is formed in the electronic flash rear side case 11, to release the lock. As a result, the electronic flash movable portion 5 starts rising (moving toward the light-emitting position) due to a tension of the tension spring 22. In the state shown in FIG. 4B, the first stopper portion 10a is in abutment with the first elastic member 20, but the second stopper portion 11c is not in abutment with the second elastic member 21, and an upper surface of the electronic flash front side case 10 has not reached the line 31 yet.

After the electronic flash unit 9 is brought into the state shown in FIG. 4B, part of the first elastic member 20 is crushed by the first stopper portion 10a due to a tension of the tension spring 22 and an inertial force acting on the electronic flash movable portion 5 when it moves upward, and as a result, the electronic flash movable portion 5 further moves upward. Then, the second stopper portion 11c comes into abutment with the second elastic member 21, bringing the electronic flash unit 9 into the state shown in FIG. 4C, and at this time, the upper surface of the electronic flash front side case 10 slightly crosses the line 31. It should be noted that an area 20a shown in FIG. 4C is an area of the first elastic member 20 which is crushed by the first stopper portion 10a.

After the electronic flash unit 9 is brought into the state shown in FIG. 4C, the electronic flash movable portion 5 further moves upward, and part of the second elastic member 21 is crushed by the second stopper portion 11c, bringing the electronic flash unit 9 into the state shown in FIG. 5A. At this time, the electronic flash movable portion 5 projects out (rises) from the camera body to the greatest degree. It should be noted that an area 21a shown in FIG. 5A is an area of the second elastic member 21 which is crushed by the second stopper portion 11c. After the electronic flash unit 9 is brought into the state shown in FIG. 5A, the electronic flash movable portion 5 is pushed back by a repulsive force of the first elastic member 20 and the second elastic member 21, and finally, the electronic flash movable portion 5 stops with the tension of the tension spring 22 and the repulsive force of the first elastic member 20 balanced, bringing the electronic flash unit 9 into the state shown in FIG. 5B.

Here, when a material to be used for the first elastic member 20 and the second elastic member 21 is examined, it is found that as a cushion material, a softer one has a higher effect of suppressing collision noise or vibration noise with respect to a shock than a harder one. However, shock on a movable member inside an elastic area of a cushion material cannot be completely absorbed unless the cushion material is sufficiently thick, and thus even when the cushion material completely crushes to lose its cushioning property (namely, go flat), the movable member cannot be static. In this case, impact noise and vibration noise arising from a collision of the movable member with the cushion material may be loud. Also, when the cushion material is thickened to a satisfactory level to increase an area that absorbs shock, an overstroke from a stop position at which a repulsive force of the cushion material and a tension of the tension spring 22 are balanced (the amount by which the movable member moves from the stop position toward the cushion material) increases. As a result, a clearance space corresponding to the overstrike is needed so as to prevent a collision between an area where there is no cushion member and the movable member is required, and this may result in upsizing of the camera body.

In the present embodiment, with consideration given to such characteristics of the cushion material, a material with a smaller elastic coefficient than the second elastic member 21 is used for the first elastic member 20. For example, sponge is used for the first elastic member 20, and silicon rubber is used for the second elastic member 21. As a result, the deformation amount of the first elastic member 20 can be held down by the second elastic member 21, and even when repeatedly used, the first elastic member 20 can be prevented from completely losing its cushioning properties, and high durability can be realized.

On the other hand, sponge becomes permanently distorted when left with a force constantly put thereon in a high-temperature environment for a long time, and hence may completely lose its cushioning properties. Thus, even when left for a long time in a high-temperature environment with the electronic flash movable portion 5 popping up in the light-emitting position, sponge used for the first elastic member 20 needs to be prevented from completely losing its cushioning properties.

Accordingly, in the present embodiment, soft and thick sponge is used for the first elastic member 20, which comes into abutment first with the first stopper portion 10a formed in the electronic flash front side case 10 which is a movable member, to reduce generation of collision noise. After the first elastic member 20 is crushed to some degree to absorb impact, the second stopper portion 11c formed in the electronic flash rear side case 11 which moves integrally with the electronic flash front side case 10 is brought into abutment with silicon rubber which is the second elastic member 21 that is harder than the first elastic member 20 and whose elasticity resists changing even in a high-temperature environment (elastic coefficient resists changing in response to a temperature change). As a result, permanent distortion of the first elastic member 20 can suppressed, silencing performance can be maintained, and overstroke can be reduced to avoid upsizing of the digital camera.

It should be noted that the range of impact absorption by only the first elastic member 20 may be increased so as to improve silencing performance. In this case, the second elastic member 21 should be disposed slightly above the position at which the electronic flash movable portion 5 stops so that the second stopper portion 11c can be brought into abutment with the second elastic member 21 when the electronic flash movable portion 5 goes beyond the light-emitting position due to an inertial force in a case where the electronic flash movable portion 5 moves from the retracted position to the light-emitting position.

Figure 6:
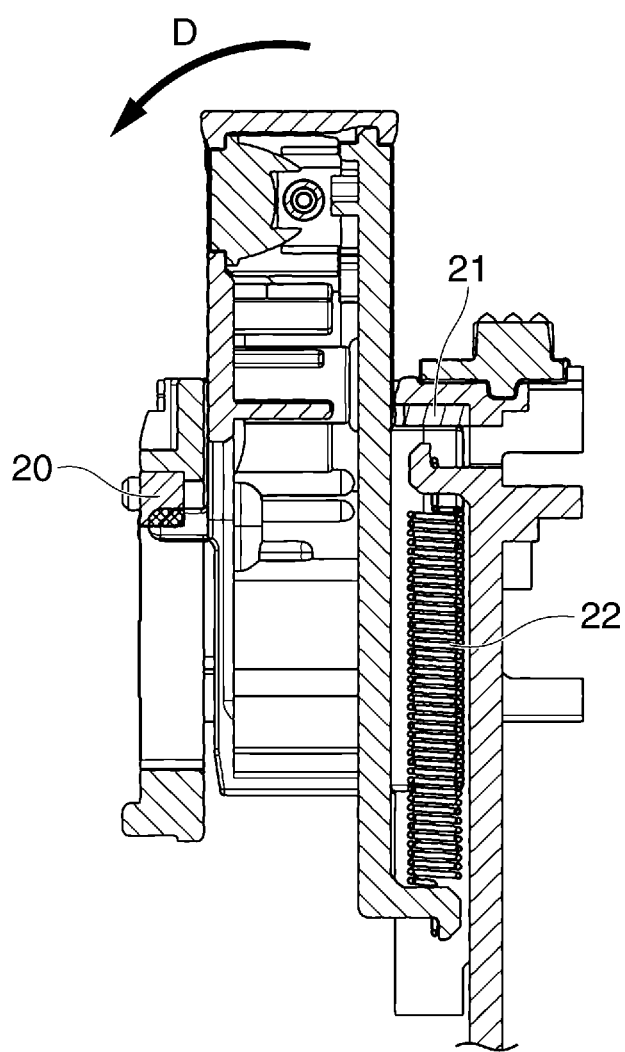
FIG. 6 is a y-z cross-sectional view showing the electronic flash unit appearing in FIG. 2A in a central part of a tension spring.

A description will now be given of the positional relationship between the first elastic member 20 and the second elastic member 21. FIG. 6 is a y-z cross-sectional view of the electronic flash unit 9 in a central part of the tension spring 22. The first elastic member 20 is disposed on a front side of the electronic flash movable portion 5 (on a front side of the digital camera 1), and the second elastic member 21 is disposed on a rear side of the electronic flash movable portion 5 (on a rear side of the digital camera 1). The tension spring 22 is disposed on a rear side of the electronic flash movable portion 5, and the second elastic member 21 is disposed on an extension of a tensioning direction.

Because the second elastic member 21 harder than the first elastic member 20 is disposed in the vicinity of the tension spring 22, the second elastic member 21 can stably receive force from the second stopper portion 11c provided in the electronic flash rear side case 11 which is movable in the tensioning (vertical) direction. It should be noted that if a hard elastic member is disposed on a front side of the electronic flash movable portion 5, a force in a rotational direction indicated by an arrow D in FIG. 6 is generated, and this causes members (such as wall portions and ribs) other than elastic members to collide with each other, and the effect of suppressing collision noise and vibration noise is reduced.

In the digital camera 1, when a flash is fired when the lens unit 2 lies at a wide-angle position at which it projects frontward, a subject is shadowed by the lens unit 2, causing so-called vignetting to occur, and this problem needs to be circumvented. For this reason, an arrangement in which the light-emitting unit (the position of the Fresnel lens 6) pops up away from the camera body as in the present embodiment is generally adopted.

In this case, by disposing the light-emitting unit as to the front as possible, occurrence of vignetting can be effectively reduced, and moreover, the amount of pop-up can be set to a small value, enabling miniaturization of the camera body. Therefore, it is preferable that the electronic flash movable portion 5 is disposed as to the front as possible in the camera body, and the lock lever 8, a mechanism for releasing the lock, and a mechanism required for pop-up including the tension spring 22 are disposed in a space left on the rear side. In this case, considering stability when the electronic flash movable portion 5 is stopped in the light-emitting position, it is preferable that the second elastic member is disposed on the rear side of the electronic flash movable portion 5.

Although in the first embodiment, sponge is used as the first elastic member 20, a low resilient elastic member such as sponge tends to harden in a low-temperature environment, and its silencing performance in a low-temperature environment may deteriorate. To address this problem, in a second embodiment, the first elastic member 20 has a double-layer structure comprised of different materials.

Figure 7:
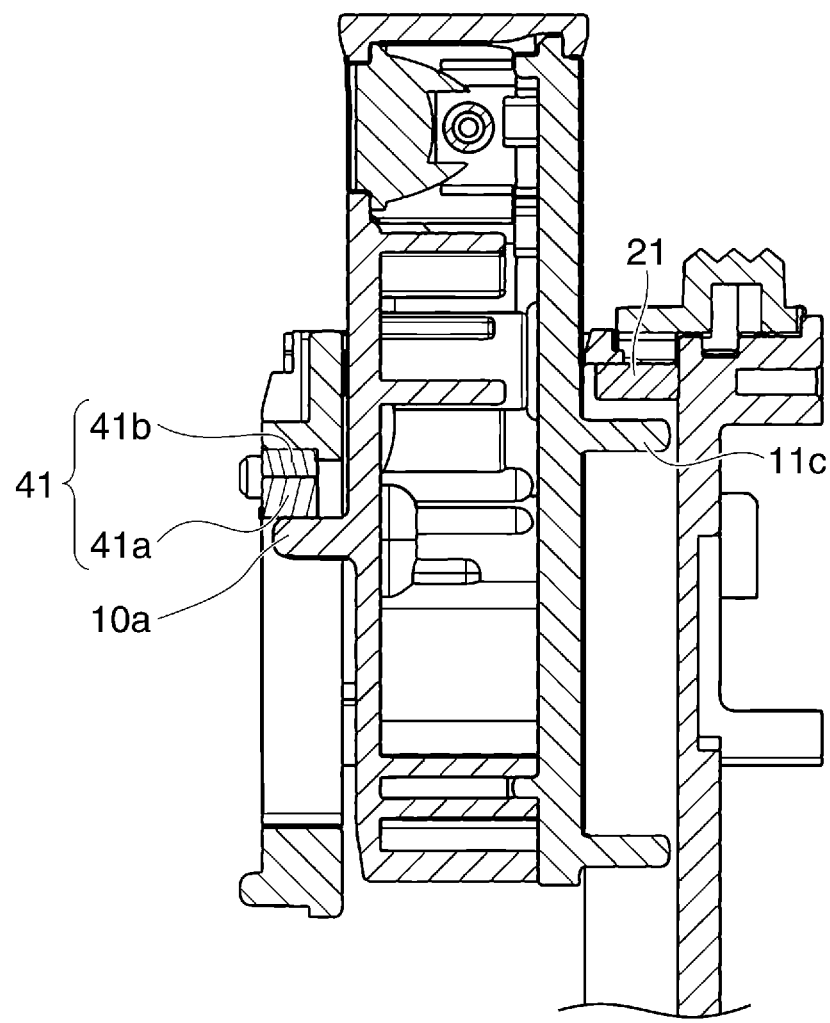
FIG. 7 is a y-z cross-sectional view showing an electronic flash unit, which a digital camera according to a second embodiment has, roughly in a central part thereof.

FIG. 7 is a y-z cross-sectional view showing an electronic flash unit, which a digital camera according to the second embodiment has, roughly in a central part thereof, and shows a state in which the first stopper portion 10a is in abutment with a first elastic member 41 while the electronic flash movable portion 5 is popping up. The first elastic member 41 has a double-layer structure comprised of a first layer 41a and a second layer 41b which are made of different materials and laid on top of one another. A material (such as sponge) whose elastic coefficient is lower (that is, repulsive force is smaller) and silencing performance is higher as compared to the second layer 41b is used for the first layer 41a with which the first stopper portion 10a is in abutment. A material (such as silicon rubber) whose silencing performance is lower but deteriorates to a smaller degree in a low-temperature environment as compared to the first layer 41a is used for the second layer 41b.

As is the case with the first embodiment, the second elastic member 21 is disposed on a rear side of the electronic flash movable portion 5, and the second stopper portion 11c comes into abutment with the second elastic member 21 after the first stopper portion 10a comes into abutment with the first elastic member 41 and becomes deformed by a predetermined amount. As a result, the amount by which the first layer 41a becomes deformed can be kept inside a predetermined range, and when repeatedly used, the first elastic member 41 can be prevented from being completely crushed and losing its cushioning properties.

Moreover, as is the case with the first embodiment, because a material such as silicon rubber whose elastic coefficient changes to a small degree in response to a temperature change is used for the second elastic member 21, permanent distortion of the first layer 41a in a high-temperature environment can be suppressed, and silencing performance can be maintained. Further, even when silencing performance deteriorates due to hardening of the first layer 41a in a low-temperature environment, the first elastic member 41 can maintain its functions as an impact absorption material because the second layer 41b resists being affected by the low-temperature environment, and as a result, silencing performance can be maintained. It should be noted that these effects can be obtained even when the positions of the first layer 41a and the second layer 41b are replaced with each other. Although in the present embodiment, the second elastic member 21 has the double-layer structure comprised of the first layer 41a and the second layer 41b, the number of layers is not limited as long as the same effects can be obtained.

A description will now be given of a rotary type light-emitting apparatus according to a third embodiment which is rotatively moved between a retracted position and a light-emitting position. Here, the light-emitting apparatus is formed as one unit, but the following description will be given only of schematic arrangement of an electronic flash movable portion and portions relating to movement of an electronic flash movable portion between the retracted position and the light-emitting position.

Figure 8A:
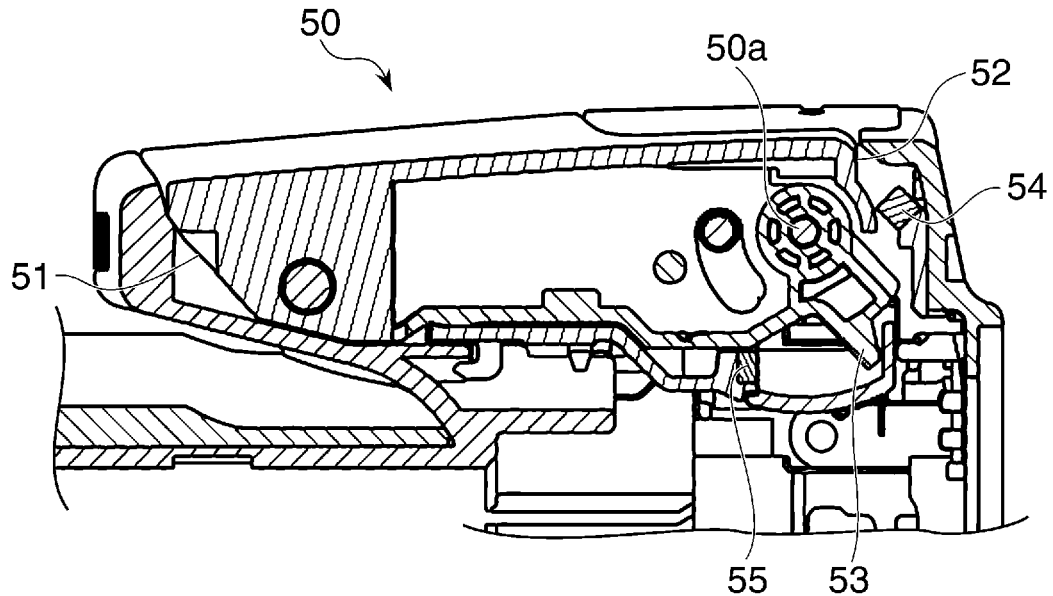
FIGS. 8A and 8B are y-z cross-sectional views showing an electronic flash unit, which a digital camera according to a third embodiment has, roughly in a central part thereof.
Figure 8B:
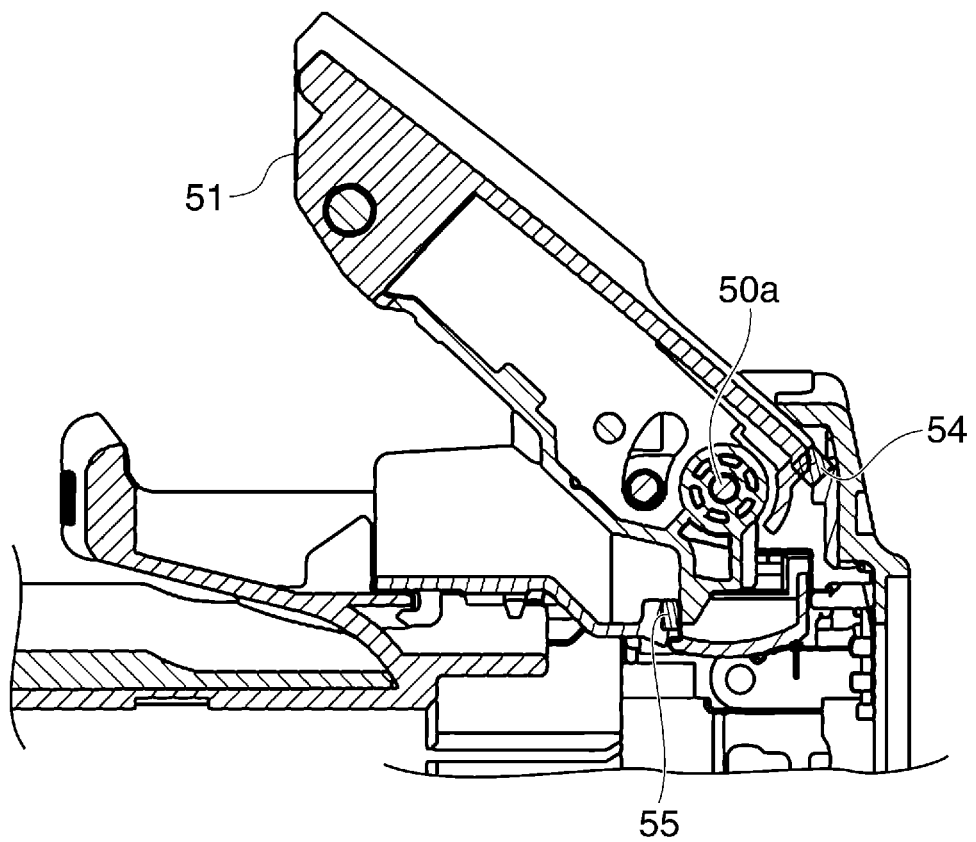

FIGS. 8A and 8B are y-z cross-sectional views of an electronic flash unit, which a digital camera according to the third embodiment has, in roughly a central part thereof, in which FIG. 8A shows a state in which the electronic flash movable portion 50 lies in the retracted position, and FIG. 8B shows a state in which the electronic flash movable portion 50 lies in the light-emitting position.

The rotary-type electronic flash movable portion 50 is urged by a spring (not shown) in a direction in which a light-emitting unit exposes itself, and rotates clockwise about a rotation shaft 50a to move from the retracted position to the light-emitting position. A subject lies on the left side as viewed in FIGS. 8A and 8B, and in the light-emitting position appearing in FIG. 8B, an electronic flash light-emitting face 51 is nearly perpendicular to a subject direction (z-direction which is a direction of an optical axis).

A first stopper portion 52, a second stopper portion 53, a first elastic member 54, and a second elastic member 55 are disposed as shown in the figures. The first elastic member 54 and the second elastic member 55 are disposed on an upper side and a bottom side, respectively, of the digital camera so as to be substantially symmetrical with respect to the rotation shaft 50a. The same materials as those used for the first elastic member 20 and the second elastic member 21 are used for the first elastic member 54 and the second elastic member 55. Namely, a material softer than the second elastic member 55 is used for the first elastic member 54. It should be noted that as with the second embodiment, the first elastic member 54 may be configured to have a double-layer structure.

When the electronic flash movable portion 50 rotates from the retracted position appearing in FIG. 8A to the light-emitting position appearing in FIG. 8B, first, the first stopper portion 52 comes into abutment with the first elastic member 54. Then, the electronic flash movable portion 50 further rotates while increasing the amount by which the first elastic member 54 is crushed, and the second stopper portion 53 comes into abutment with the second elastic member 55. After the second elastic member 55 is slightly crushed by an inertia force generated during the rotation of the electronic flash movable portion 50, the electronic flash movable portion 50 is moved back in an opposite direction by a repulsive force of the second elastic member 55 to stop in the light-emitting position appearing in FIG. 8B.

At this time, the first elastic member 54 and the second elastic member 55 are positioned to be nearly symmetrical with respect to the rotation shaft 50a of the electronic flash movable portion 50, a direction in which one stopper portion impacts a bearing portion of the rotation shaft 50a and a direction in which the other stopper portion impacts the bearing portion of the rotation shaft 50a are opposite. As a result, high silencing performance can effectively be obtained.

Moreover, in the present embodiment, as is apparent from the above description, the rotation angle of the electronic flash movable portion 50 until the first stopper portion 52 comes into abutment with the first elastic member 54 is smaller than the rotation angle of the electronic flash movable portion 50 until the second stopper portion 53 comes into abutment with the second elastic member 55. Further, the first elastic member 54 and the second elastic member 55 are disposed so that the distance between the center of rotation (the rotation shaft 50a) and the first elastic member 54 can be shorter than the distance between the center of rotation and the second elastic member 55.

Because the distance between the center of rotation and the first elastic member 54 is short, the rotation angle of the electronic flash movable portion 50 until it stops at the stop position after the first stopper portion 52 comes into abutment with the first elastic member 54, that is, the amount by which the first elastic member 54 is crushed can be large. In other words, the range of deceleration of the electronic flash movable portion 50 can be wide. Therefore, collision noise and vibration noise can effectively be suppressed. On the other hand, the second elastic member 55 plays a role in determining the angle of the electronic flash light-emitting face 51, and hence by keeping a long distance between the center of rotation and the second elastic member 55, the angle of the electronic flash light-emitting face 51 when the electronic flash movable portion 50 stops at the stops position can be more accurate.

It should be noted that in order to avoid vignetting, the position of the electronic flash light-emitting face 51 is preferably as far away from the optical axis as possible, and accordingly, the rotation shaft 50a is disposed on an upper side of the camera body. As a result, a space can easily be left below the rotation shaft 50a. Conversely, from the viewpoint of avoiding upsizing of the camera body, space is tight above the rotation shaft 50a. For this reason, considering that the second elastic member 55 is preferably disposed away from the rotation center, it can be said that the arrangement in which the second elastic member 55 is disposed below the rotation shaft 50a is desirable.

As described above, according to the embodiments described above, collision noise, vibration noise, and so on generated when the movable portion of the light-emitting apparatus is moved from the retracted position to the light-emitting position can be reduced. This effect is unsusceptible to a change in the temperature of an environment in which the image pickup apparatus is used, and hence a high degree of operability for a user can be realized. Further, space-saving of the image pickup apparatus can be realized.

In the embodiments described above, the light-emitting apparatus formed as one unit is mounted on the camera body as is apparent from the above description, and hence, for example, in the first embodiment, both the first stopper portion 10a and the second stopper portion 11c are constituent elements of the light-emitting apparatus. On the other hand, the light-emitting apparatus may not be formed as one unit, and the first stopper portion 10a and the second stopper portion 11c may be provided in the camera body. This modification is possible in the second and third embodiments as well.

Moreover, although in the embodiments described above, a spring member is used as the moving unit that rectilinearly moves or rotates the electronic flash movable portion 5, the present invention may be applied to an arrangement in which a motor or a gear is used as the moving unit.

Further, although in the embodiments described above, a xenon tube is used for the light-emitting unit, the present invention may be applied even to an arrangement in which another light source such as an LED is used for the light-emitting unit.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-159604 filed Jul. 18, 2012, which is hereby incorporated by reference herein in its entirety.

What is claimed is:

1. A light-emitting apparatus having a movable portion including a light-emitting unit and capable of moving between a retracted position and a light-emitting position, comprising:
   a first elastic member; and
   a second elastic member configured to have a higher elastic coefficient than said first elastic member,
   wherein the movable portion comprises a first stopper portion coming into abutment with said first elastic member when the movable portion moves from the retracted position to the light-emitting position, and a second stopper portion coming into abutment with said second elastic member when the movable portion moves from the retracted position to the light-emitting position, and
   when the movable portion moves from the retracted position to the light-emitting position, the first stopper portion comes into abutment with said first elastic member, causing said first elastic member to become deformed by a predetermined amount, and then the second stopper portion comes into abutment with said second elastic member.

2. The light-emitting apparatus according to claim 1, wherein as compared to said first elastic member, a degree of change in the elastic coefficient of said second elastic member in response to a temperature change is smaller.

3. The light-emitting apparatus according to claim 1, wherein:
   said first elastic member comprises a first layer and a second layer made of different materials laid on top of one another, and a degree of change in an elastic coefficient of the second layer in response to a temperature change is smaller as compared to the first layer, and
   as compared to the first layer, said second elastic member has a higher elastic coefficient, and a degree of change in the elastic coefficient of said second elastic member in response to a temperature change is smaller.

4. The light-emitting apparatus according to claim 1, further comprising a spring configured to rectilinearly move movable portion from the retracted position to the light-emitting position using a tension,
   wherein said second elastic member is disposed closer to said spring than said first elastic member.

5. The light-emitting apparatus according to claim 4, wherein said first elastic member and said second elastic member are disposed on a front side and a rear side, respectively, of an image pickup apparatus when the light-emitting apparatus is incorporated into the image pickup apparatus.

6. The light-emitting apparatus according to claim 1, further comprising a moving unit configured to rotatively move the movable portion from the retracted position to the light-emitting position,
   wherein said first elastic member and said second elastic member are disposed symmetrically with respect to a rotation center of the movable portion.

7. The light-emitting apparatus according to claim 6, wherein said first elastic member and said second elastic member are disposed so that a distance between the rotation center and said first elastic member can be shorter than a distance between the rotation center and said second elastic member.

8. The light-emitting apparatus according to claim 6, wherein said first elastic member is disposed on an upper side of an image pickup apparatus when the light-emitting apparatus is incorporated into the image pickup apparatus, and said second elastic member is disposed on a bottom side of the image pickup apparatus when the light-emitting apparatus is incorporated into the image pickup apparatus.

9. An image pickup apparatus comprising a light-emitting apparatus configured to have a movable portion including a light-emitting unit and capable of moving between a retracted position and a light-emitting position, a first elastic member and a second elastic member having a higher elastic coefficient than the first elastic member, in which the movable portion comprises a first stopper portion coming into abutment with the first elastic member when the movable portion moves from the retracted position to the light-emitting position, and a second stopper portion coming into abutment with the second elastic member when the movable portion moves from the retracted position to the light-emitting position, and when the movable portion moves from the retracted position to the light-emitting position, the first stopper portion comes into abutment with the first elastic member, causing the first elastic member to become deformed by a predetermined amount, and then the second stopper portion comes into abutment with the second elastic member.

* * * * *